(12) United States Patent
Wernlund

(10) Patent No.: US 11,761,420 B2
(45) Date of Patent: Sep. 19, 2023

(54) COMPOSITE MATERIAL, A WIND TURBINE BLADE, A WIND TURBINE AND A METHOD FOR PRODUCING A COMPOSITE MATERIAL

(71) Applicant: Siemens Gamesa Renewable Energy A/S, Brande (DK)

(72) Inventor: Thomas Bro Wernlund, Hjørring (DK)

(73) Assignee: SIEMENS GAMES RENEWABLE ENERGY A/S

( * ) Notice: Subject to any disclaimer, the term of this patent is extended or adjusted under 35 U.S.C. 154(b) by 261 days.

(21) Appl. No.: 16/515,504

(22) Filed: Jul. 18, 2019

(65) Prior Publication Data
US 2020/0025168 A1 Jan. 23, 2020

(30) Foreign Application Priority Data
Jul. 23, 2018 (EP) ..................................... 18185016

(51) Int. Cl.
*F03D 1/06* (2006.01)
(52) U.S. Cl.
CPC ........ *F03D 1/0675* (2013.01); *F05B 2220/30* (2013.01); *F05B 2230/232* (2013.01); *F05B 2240/301* (2013.01); *F05B 2280/4002* (2013.01); *F05B 2280/6012* (2013.01)
(58) Field of Classification Search
CPC .......... F03D 1/067; F03D 1/0675; F03D 1/06; F05B 2220/30; F05B 2220/232; F05B 2240/301; F05B 2280/4002; F05B 2280/6012
See application file for complete search history.

(56) References Cited

U.S. PATENT DOCUMENTS

| | | | | |
|---|---|---|---|---|
| 4,976,587 A | * | 12/1990 | Johnston | ............... F03D 1/0675 416/239 |
| 5,462,623 A | | 10/1995 | Day | |
| 5,834,082 A | * | 11/1998 | Day | ......................... E04C 2/36 428/56 |

(Continued)

FOREIGN PATENT DOCUMENTS

| | | |
|---|---|---|
| CN | 102220945 A | 10/2011 |
| CN | 103262676 A | 8/2013 |

(Continued)

OTHER PUBLICATIONS

European Extended Search Report dated Jan. 31, 2019 for Application No. 18185016.5.

*Primary Examiner* — Sabbir Hasan
*Assistant Examiner* — Joshua R Beebe
(74) *Attorney, Agent, or Firm* — Schmeiser, Olsen & Watts LLP

(57) ABSTRACT

Provided is a composite material for a wind turbine blade, the composite material including a plurality of rigid elements and plurality of flexible elements, wherein each flexible element is arranged between two rigid elements and is connected thereto such that the rigid elements are flexibly connected to each other by the flexible elements. The flexibility of the composite material can be achieved by using the interspaces between the rigid elements. Therefore, when the composite material is placed on a curved surface, hollow spaces between the rigid elements may be reduced or avoided.

13 Claims, 5 Drawing Sheets

(56) References Cited

U.S. PATENT DOCUMENTS

| | | | | |
|---|---|---|---|---|
| 7,694,479 B2* | 4/2010 | Killen | ............... | B32B 7/12 |
| | | | | 52/309.5 |
| 8,157,939 B2* | 4/2012 | Stiesdal | ............ | B29D 99/0025 |
| | | | | 156/180 |
| 8,389,104 B2* | 3/2013 | Day | ............... | E04C 2/36 |
| | | | | 428/153 |
| 10,107,257 B2* | 10/2018 | Yarbrough | ............ | B29C 70/521 |
| 10,179,425 B2* | 1/2019 | Hunter | ............ | B29B 11/16 |
| 10,422,316 B2* | 9/2019 | Yarbrough | ............ | B29D 99/0028 |
| 10,428,790 B2* | 10/2019 | Smith | ............ | B29D 99/0028 |
| 2004/0128948 A1* | 7/2004 | Killen | ............ | B32B 27/302 |
| | | | | 52/782.1 |
| 2009/0269557 A1* | 10/2009 | Stiesdal | ............ | B29C 70/88 |
| | | | | 428/195.1 |
| 2011/0081518 A1* | 4/2011 | Day | ............... | E04C 2/296 |
| | | | | 428/106 |
| 2011/0274553 A1 | 11/2011 | Stiesdal | | |
| 2012/0051937 A1* | 3/2012 | Grase | ............ | B64C 1/06 |
| | | | | 428/688 |
| 2013/0224023 A1 | 8/2013 | Kim et al. | | |
| 2016/0052173 A1* | 2/2016 | Hunter | ............ | B29C 70/34 |
| | | | | 416/230 |
| 2016/0319801 A1* | 11/2016 | Smith | ............ | B29C 70/547 |
| 2017/0074241 A1 | 3/2017 | Koike | | |
| 2017/0082089 A1* | 3/2017 | Yarbrough | ............ | B29C 70/528 |
| 2017/0276117 A1 | 9/2017 | Church | | |
| 2018/0058422 A1* | 3/2018 | Yarbrough | ............ | B29C 70/443 |
| 2019/0226447 A1 | 7/2019 | Stecher et al. | | |

FOREIGN PATENT DOCUMENTS

| | | |
|---|---|---|
| CN | 106103984 A | 11/2016 |
| CN | 106795863 A | 5/2017 |
| EP | 1561947 B1 | 4/2017 |
| EP | 3517772 A1 | 7/2019 |
| WO | WO 2007035758 A1 | 3/2007 |

* cited by examiner

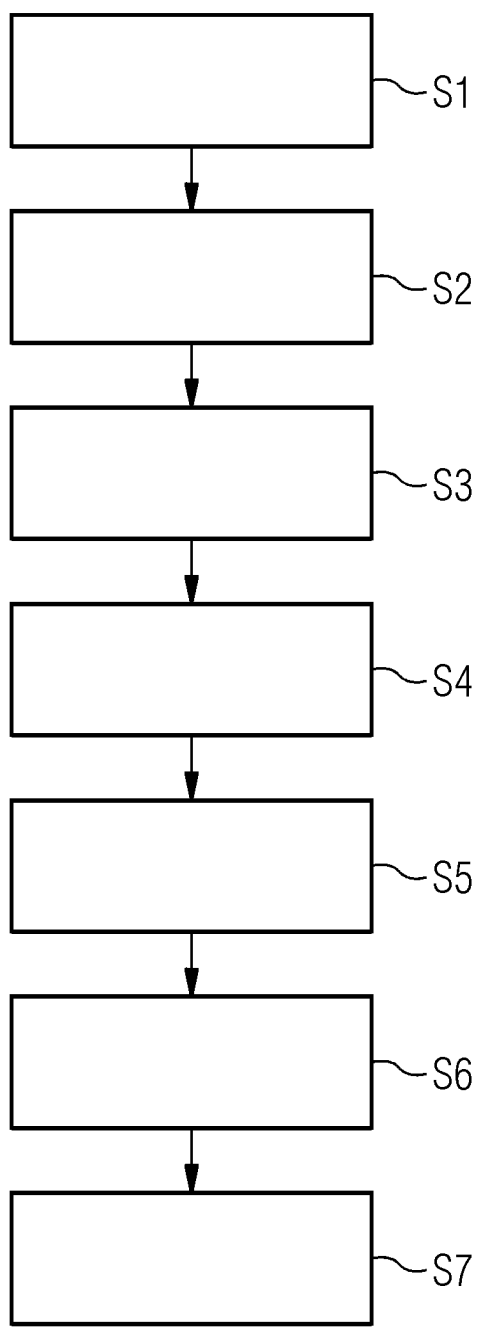

COMPOSITE MATERIAL, A WIND TURBINE BLADE, A WIND TURBINE AND A METHOD FOR PRODUCING A COMPOSITE MATERIAL

CROSS-REFERENCE TO RELATED APPLICATION

This application claims priority to European Application No. 18185016.5, having a filing date of Jul. 23, 2018, the entire contents of which are hereby incorporated by reference.

FIELD OF TECHNOLOGY

The following relates to a composite material, a wind turbine blade comprising such a composite material, a wind turbine comprising such a wind turbine blade and a method for producing the composite material.

BACKGROUND

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. Presently, there is a need for long wind turbine blades requiring stronger sandwich core materials.

Rotor blades of this kind may comprise wood, in particular balsa wood. Wood from Ochroma pyramidale, commonly known as the balsa tree, is very soft and light, with a coarse, open grain. The density of dry balsa wood ranges from 40-340 kg/m$^3$, with a typical density of about 160 kg/m$^3$. Since balsa wood has these outstanding properties it is often used in aircraft and wind turbine technology to produce lightweight components.

Making a balsa wood panel flexible to enable it to follow curved wind turbine blade geometries is achieved by providing a glass fiber mesh or net, in particular in the form of a so-called scrim cloth, on the balsa wood panel. The glass fiber mesh may be applied by adding a wet glue to the glass fiber mesh and then rolling it onto the balsa wood panel followed by curing the glue or by rolling on a glass fiber mesh with a thermoplastic pre-applied glue onto the balsa wood panel by application of elevated temperature. After applying the glass fiber mesh and curing the glue, the balsa wood panel is cut into modules which are connected to each other solely by means of the glass fiber mesh. The balsa wood panel is now flexible and can be adapted to a curved surface.

SUMMARY

An aspect relates to an improved composite material for a wind turbine blade.

Accordingly, a composite material for a wind turbine blade is provided. The composite material comprises a plurality of rigid elements and plurality of flexible elements, wherein each flexible element is arranged between two rigid elements and is connected thereto such that the rigid elements are flexibly connected to each other by means of the flexible elements.

This has the advantage that the flexibility of the composite material can be achieved by using the interspaces between the rigid elements. Therefore, when the composite material is placed on a curved surface and, thus, bended, hollow spaces between the rigid elements may be reduced or avoided. This is in particular relevant when thick rigid elements are used. Using a flexible material between the rigid elements has the advantage that breaking of the composite material may be avoided. Thus, efficiency may be increased when the rigid elements are produced, in particular cut. Furthermore, the efficiency in the blade manufacturing process may be increased.

The rigid element and the flexible element are made of different materials. The composite material is a two-material sandwich core material. In particular, the composite material is a panel. "Rigid element" and "flexible element" mean that the rigid element has a greater stiffness than the flexible element. Each flexible element is connected to a side face of one rigid element and to a further side face of a further rigid element, wherein the side face and the further side face, face each other when the composite material is evenly spread out, i.e. is not bended. In particular, all rigid elements are identical. For example, all flexible elements are provided identical.

According to an embodiment, the composite material forms a flat and/or adaptable material configured to adapt to a curved surface when being mounted.

Thus, the composite material can be adapted to the curved surface without breaking. A blade shell is provided having the curved surface and the composite material mounted on the curved surface.

According to a further embodiment, the flexible elements fill gaps between the rigid elements completely such that a surface formed by the rigid elements and the flexible elements is even.

In particular, the flexible elements are provided as filling material between the rigid elements. This has the advantage that after mounting the composite material undesirable hollow spaces in the composite material may be avoided. Thus, additional filling material, in particular blade resin, may be avoided in such hollow spaces. Since the flexible material, for example, is more rigid than blade resin, a rigidity of the blade shell may be increased.

According to a further embodiment, the rigid elements and the flexible elements are bar-shaped.

This mean that a length of the rigid element is several times, in particular at least 10 times, larger than a height and/or width of the rigid element. The rigid elements are provided as bars or beams.

According to a further embodiment, the rigid elements are made of balsa wood or rigid cellular foam.

This has the advantage that balsa wood has the excellent weight and mechanical characteristics. Moreover, balsa wood is a renewable resource. The composite material is a flexible wood panel. For example, the rigid cellular foam may comprise or is made of a metal, in particular aluminum, or a plastic material.

According to a further embodiment, each rigid element has a rectangular cross-sectional shape, in particular being constant along a longitudinal axis of the rigid element.

This has the advantage that the rigid elements may be simply produced, in particular by means of cutting and/or sawing. Also the flexible elements may have a rectangular cross-sectional shape when the composite material is evenly spread out.

According to a further embodiment, the flexible elements are plastically or elastically deformable.

"Elastically deformable" means that the flexible element deforms back in an initial state. "Plastically deformable" means that the flexible element can be irreversibly deformed due to its ductility. The flexible elements have a greater ductility than the rigid elements. The ductility of the flexible elements is chosen such that, for example, contourability is induced to the composite material merely by gravity or by forcing it manually into blade geometry shape such the composite material stays in this shape due to plastic deformation.

According to a further embodiment, the flexible elements are connected to the rigid elements by means of an adhesive or hot plate welding.

Thus, a sufficient strength of the composite material may be achieved. Further, detaching of rigid elements from the composite material may be avoided.

According to a further embodiment, the rigid elements have a first elasticity modulus and the flexible elements have a second elasticity modulus, wherein the first elasticity modulus is greater than the second elasticity modulus.

The first elasticity modulus is at least 1.5, 2, 3 or 4 times greater than the second elasticity modulus. Thus, the rigid element is significantly stiffer than the flexible element.

According to a further embodiment, between 3 and 20, 4 and 15, or 4 and 10, in particular 4, 5, 6, or 7, rigid elements are connected to form a single module which can be handled as one piece.

Thus, modules may be provided which are manageable by hand force of an assembly worker. The module is produced by means of cutting through two flexible elements.

According to a further embodiment, the flexible elements comprise plastic material, in particular thermoplastic material, elastomeric material and/or thermosetting material.

According to a further embodiment, the flexible elements comprise a highly closed cell material.

In particular, the highly closed cell material comprises a metal or metal foam.

Further, a wind turbine blade for a wind turbine is provided. The wind turbine blade comprises such a composite material. The wind turbine blade comprises a curved portion, in particular a curved surface, wherein the composite material is in surface contact with the curved portion and/or bonded to the curved surface.

However, the composite material can be used in any other applications related to wind turbines.

Furthermore, a wind turbine is provided. The wind turbine comprises such a composite material and/or such a wind turbine blade.

The wind turbine has a plurality of wind turbine blades. "Wind turbine" presently refers to an apparatus converting the wind's kinetic energy into rotational energy, which may again be converted to electrical energy by the apparatus.

Moreover, a method for producing a composite material, in particular such a composite material, for a wind turbine blade is provided. The method comprises the steps of: a) providing a plurality of rigid elements, b) providing a plurality of flexible elements, c) arranging each flexible element between two rigid elements, and d) connecting each flexible element to two rigid elements such that the rigid elements are flexibly connected to each other by means of the flexible elements.

The embodiments and features described with reference to the composite material of the present invention apply mutatis mutandis to the method of the present invention.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with references to the following Figure, wherein like designations denote like members, wherein:

FIG. 7 shows a block diagram of an embodiment of a method for producing the composite material according to FIG. 3.

DETAILED DESCRIPTION

Figure 1:
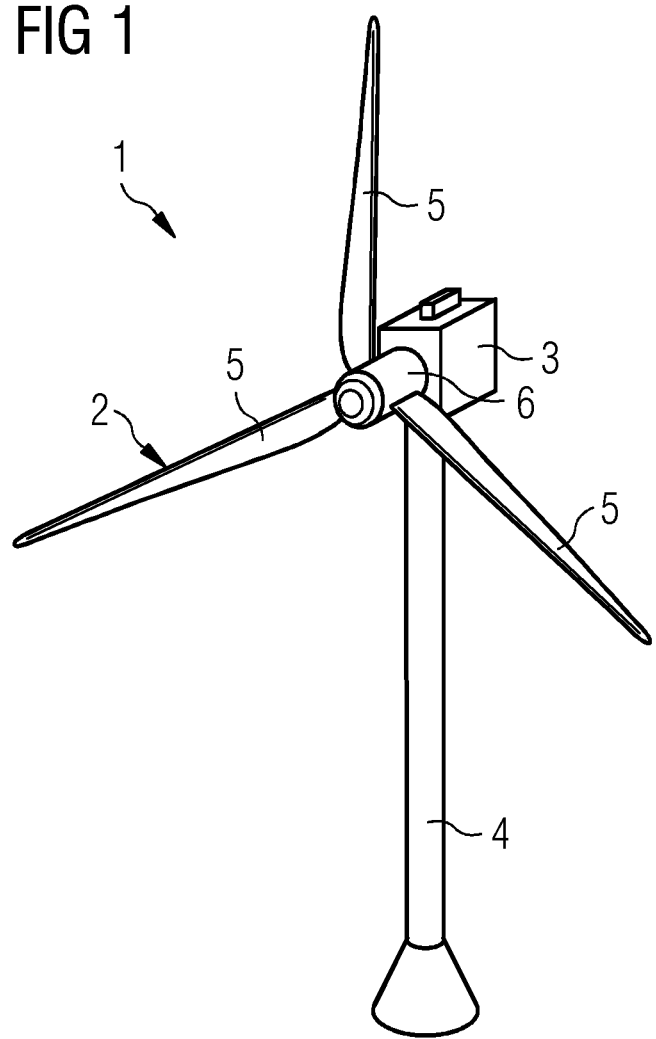
FIG. 1 is a perspective view of a wind turbine according to one embodiment.

FIG. 1 shows a wind turbine 1 according to one embodiment.

The wind turbine 1 comprises a rotor 2 connected to a generator (not shown) arranged inside a nacelle 3. The nacelle 3 is arranged at the upper end of a tower 4 of the wind turbine 1.

The rotor 2 comprises three wind turbine blades 5. The wind turbine blades 5 are connected to a hub 6 of the wind turbine 1. Rotors 2 of this kind may have diameters ranging from, for example, 30 to 160 meters or even more. The wind turbine blades 5 are subjected to high wind loads. At the same time, the wind turbine blades 5 need to be lightweight. For these reasons, wind turbine blades 5 in modern wind turbines 1 are manufactured from fiber-reinforced composite materials. Therein, glass fibers are generally preferred over carbon fibers for cost reasons. Oftentimes, glass fibers in the form of unidirectional fiber mats are used.

Figure 2:
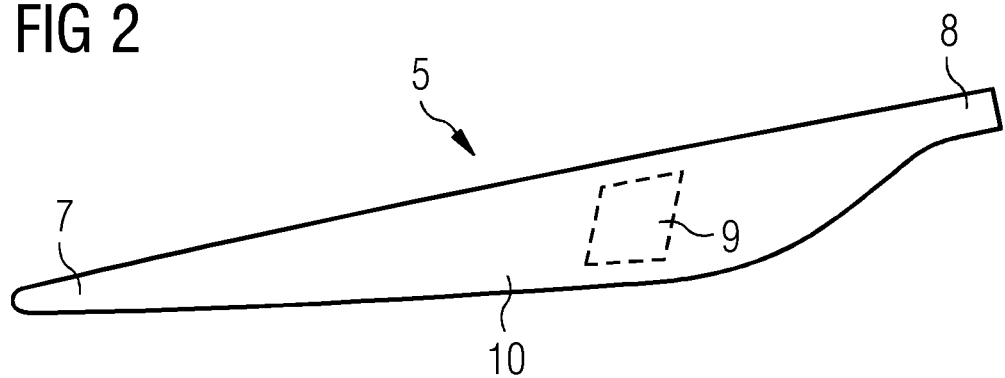
FIG. 2 is a perspective view of a wind turbine blade according to one embodiment.

FIG. 2 shows a wind turbine blade 5 according to one embodiment.

The wind turbine blade 5 comprises an aerodynamically designed portion 7, which is shaped for optimum exploitation of the wind energy and a blade root 8 for connecting the rotor blade 5 to the hub 6. Further, a composite material 9 (schematically shown) is provided which reinforces a blade shell 10 of the wind turbine blade 5.

Figure 3:
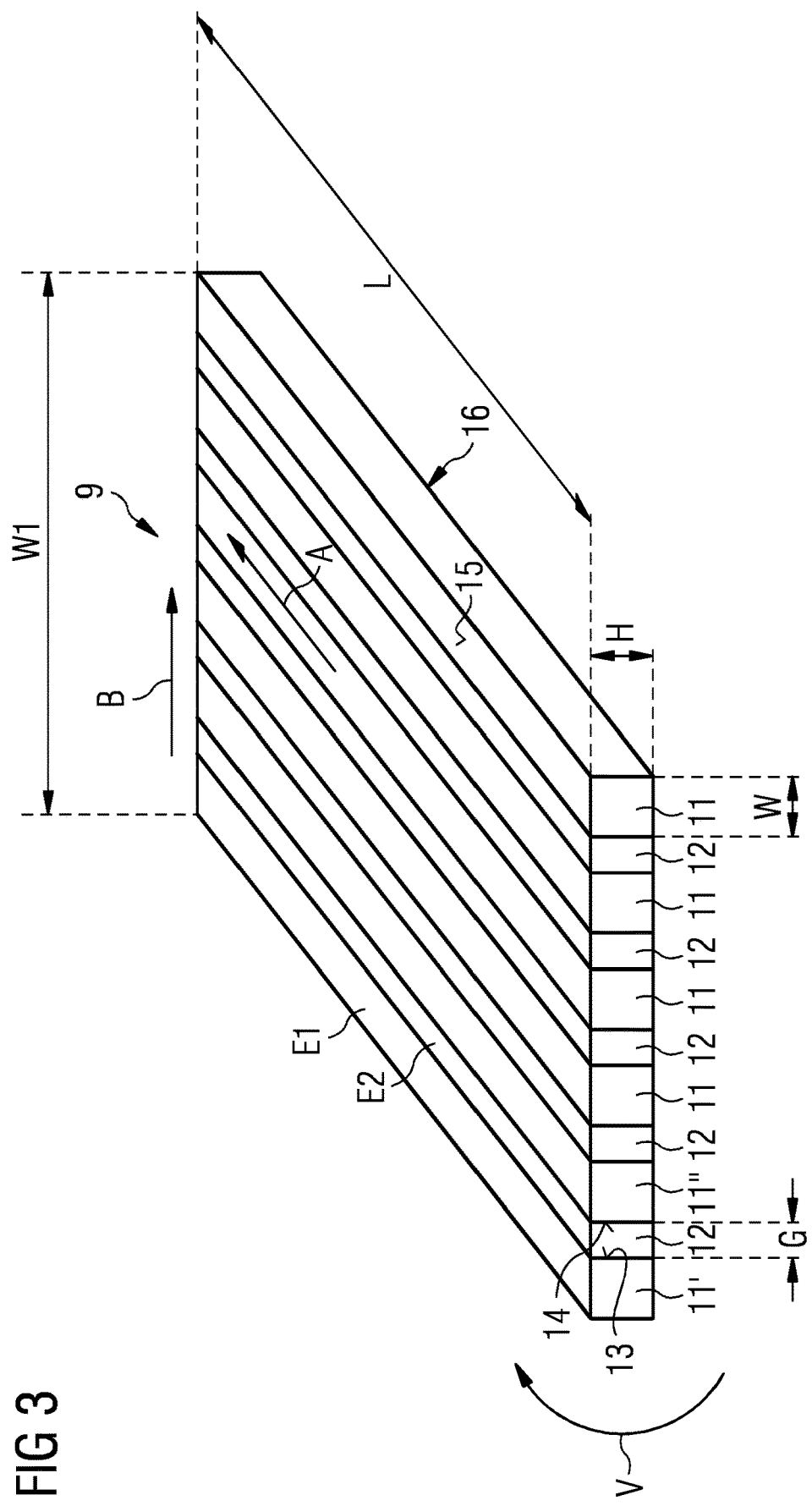
FIG. 3 shows a perspective view of a composite material according to one embodiment.

FIG. 3 shows a perspective view of the composite material 9 according to one embodiment.

The composite material 9 comprises a plurality of rigid elements 11 and plurality of flexible elements 12, wherein each flexible element 12 is arranged between two rigid elements 11 and is connected thereto such that the rigid elements 12 are flexibly connected to each other by means of the flexible elements 12.

The rigid elements 11 have an elasticity modulus E1 (also referred as first elasticity modulus) and the flexible elements 12 have an elasticity modulus E2 (also referred as second elasticity modulus), wherein the elasticity modulus E1 is greater than the elasticity modulus E2. The elasticity modulus E1 is at least 1.5, 2, 3 or 4 times greater than the elasticity modulus E2. Thus, the rigid elements 11 are significantly stiffer than the flexible elements 12.

The flexible elements 12 are merely indirectly connected to each other by means of the rigid elements 11. Therefore, the flexible elements 12 are not attached to each other when the composite material 9 is evenly spread out, i.e. is not bended, as shown in FIG. 3. The rigid elements 11 and the flexible element 12 are made of different materials. In particular, all rigid elements 11 are provided identical. For example, also all flexible elements 12 are provided identical. Each flexible element 12 is connected to a side face 13 of one rigid element 11' and to a further side face 14 of a further rigid element 11". The side face 13 and the further side face 14 face each other. A gap G is provided between the side face 13 and side face 14.

The flexible elements 12 fill all gaps G between the rigid elements 11 completely such that a surface 15 formed by the rigid elements 11 and the flexible elements 12 is even. "Completely" means up to a complete height H of the rigid elements 11. Therefore, the flexible elements 12 are provided as filling material between the rigid elements 11.

Figure 4:
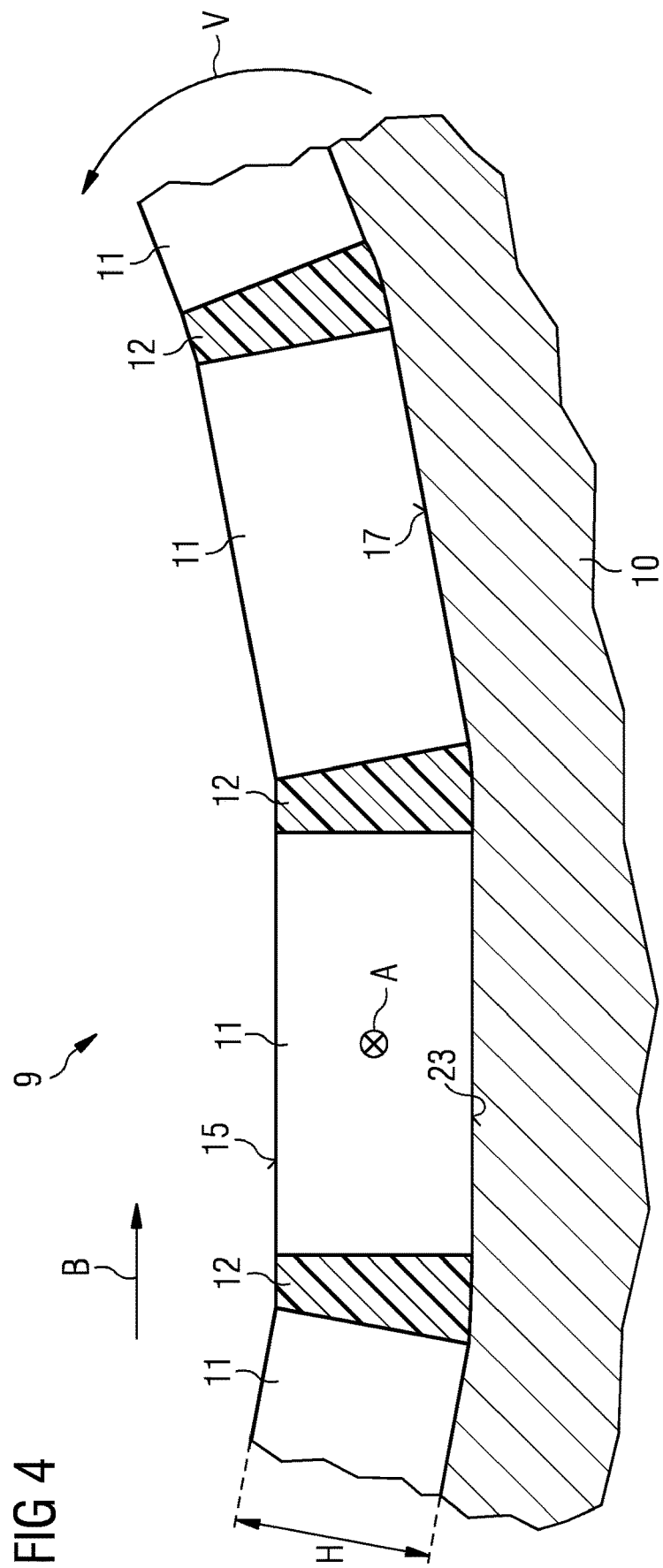
FIG. 4 shows a side view of the composite material according to a further embodiment.

This has the advantage that after mounting the composite material 9 undesirable hollow spaces in the composite material 9 may be avoided (see also FIG. 4). Thus, additional filling material, in particular blade resin, may be avoided in the gaps G. It is noted that resin in the gaps G can lead to a weak structure since resin, for example, has a lower rigidity than the flexible material 12.

The rigid elements 12 and the flexible elements 11 are bar-shaped. This means that a length L of the rigid elements 11 is several times, in particular at least 10 times, larger than the height H and/or a width W of the rigid elements 11. Therefore, the composite material 9 is flexible in one bending direction V, i.e. around a longitudinal axis A of the rigid elements 11.

The rigid elements 11 are made of balsa wood. In particular, the composite material 9—in this case—is a flexible wood panel. Alternatively, the rigid elements 11 are made of rigid cellular foam. For example, the rigid cellular foam may comprise or is made of a metal, in particular aluminum, and/or a plastic material.

Each rigid element 11 has a rectangular cross-sectional shape, in particular being constant along the longitudinal axis A of the rigid elements 11. Thus, the rigid element 11 may be simply produced, in particular by means of cutting and/or sawing. The flexible elements 12 have also a rectangular cross-sectional shape when the composite material 9 is evenly spread out and/or the flexible elements 12 are not deformed.

In particular, the flexible elements 12 comprise a highly closed cell material. The highly closed cell material comprises a metal or metal foam, in particular an aluminum foam. Additionally, or alternatively, the flexible elements 12 may comprise plastic material, in particular thermoplastic material, elastomeric material and/or thermosetting material.

The composite material 9 is provided as a module 16. This means that the rigid elements 11 are connected to one module 16 which is separately manageable as one composite component. Thus, modules 16 may be provided which are manageable by hand force of an assembly worker. The module 16 comprises 6 rigid elements 11 and 5 flexible elements 12. However, these numbers can vary depending on the application.

The module 16 comprises between 3 and 20, 4 and 15, or 4 and 10, in particular 6 rigid elements 11. The module 16 is produced by means of cutting through two flexible elements 12. The rigid elements 11 and the flexible elements 11 alternate in a direction B which runs perpendicular to axis A.

FIG. 4 shows a side view of the composite material 9 according to a further embodiment.

The composite material 9 forms a flat and adaptable material which rests on and is adapted in shape to a curved surface 17 of the blade shell 10. In this state the composite material 9 reinforces the blade shell 10. As shown in FIG. 4 the flexible elements 12 are deformed such that the rigid elements can be adapted to the curved surface 17. The rigid elements 11 are not deformed. Thus, the composite material 9 can be adapted to the curved surface 15 without breaking. The composite material 9 may be in surface contact with surface 17 across its entire surface 15 (or surface 23 in another embodiment, not shown). For example, the composite material 9 may be bonded to the surface 17 using an adhesive.

The flexible elements 12 are plastically or elastically deformable. In particular, the flexible elements 12 have a greater ductility than the rigid element 11. The ductility of the flexible elements is chosen such that, for example, contourability is induced to the composite material merely by gravity or by forcing it manually into the geometry of the curved surface 17 such that the composite material 9 stays in this shape due to plastic deformation.

As shown in FIG. 4, the composite material 9 is bended around the direction V. The advantage of such flexible elements 12 is that hollow spaces between the rigid elements 11 are avoided. This is in particular relevant when thick (i.e. height H is increased) rigid elements 11 are used.

Figure 5:
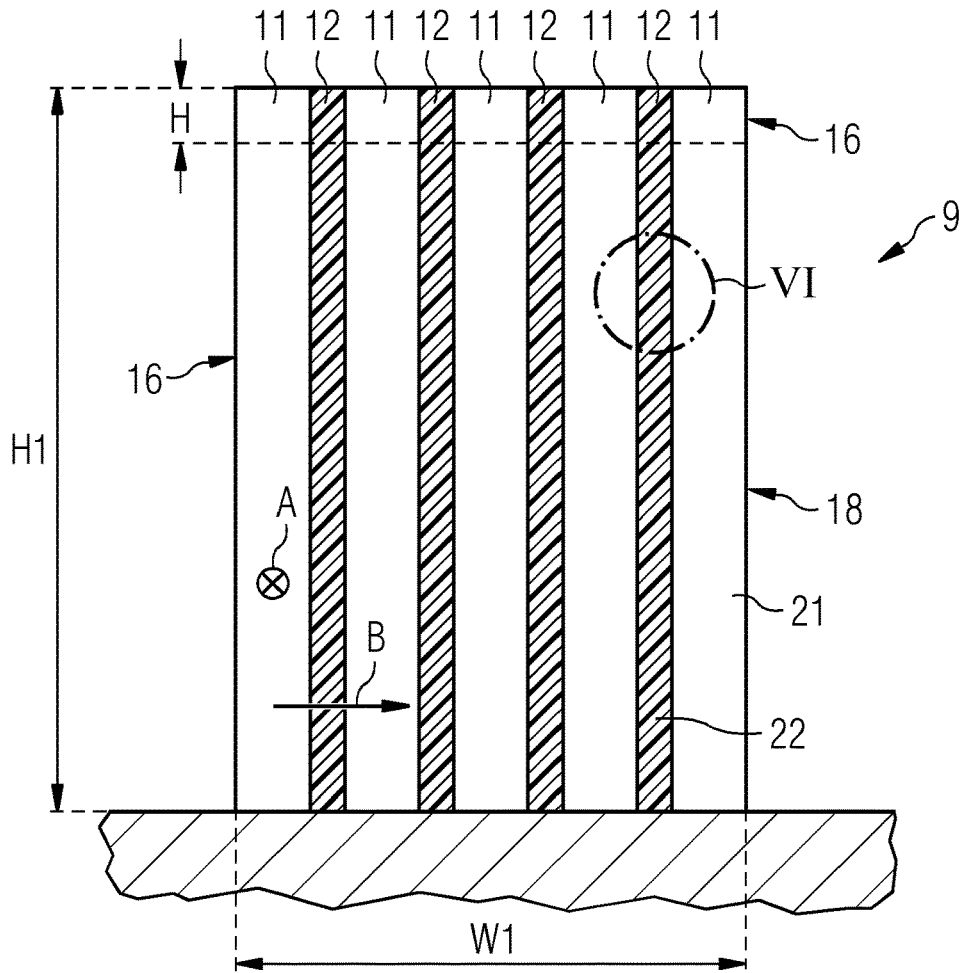
FIG. 5 shows a side view of the composite material according to a further embodiment.

FIG. 5 shows a side view of the composite material 9 before being provided as a mountable module 16, as shown in FIG. 3.

The composite material 9 is provided as semi-finished block 18. By contrast to module 16, the block 18 has the height H1 which is several times, in particular at least 3, 5, 7 or 10 times, larger than the height H. Each rigid element 21 and/or flexible element 22 has the height H1.

By cutting the block 18 into portions having the height H, several modules 16 can be produced. The block 18 is produced by means of cutting through two flexible elements 22.

Figure 6:
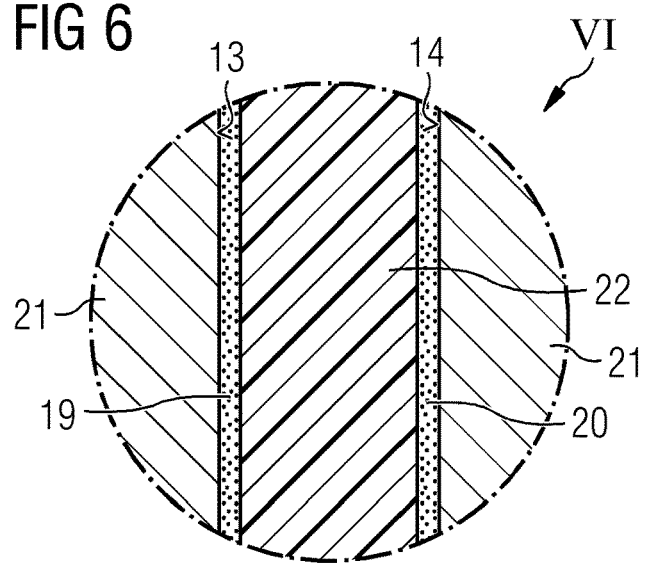
FIG. 6 shows a detail view VI from FIG. 5.

FIG. 6 shows a detail view VI from FIG. 5.

The flexible elements 22, for example, are connected to the rigid elements 21 by means of an adhesive, in particular an adhesive layer 19, arranged between the face 13 and the flexible element 22 and an adhesive, in particular adhesive layer 20, arranged between the face 14 and the flexible element 22.

Alternatively, the rigid elements 21 may be connected to the flexible element 22 by means of hot plate welding. In this case the layers 19, 20 may be provided as melted and then solidified zones.

Thus, sufficient strength of the composite material 9 may be achieved. Therefore, detaching of the rigid elements 11 from the flexible element 12 may be avoided.

FIG. 7 shows a block diagram of an embodiment of a method for producing the composite material 9 according to FIG. 3 or the wind turbine blade 5 according to FIG. 2.

In a first step S1 a plurality of rigid elements 21 each having the height H1, the width W and the length L are provided. The rigid elements 21 may be provided from balsa wood, in particular by sawing. Alternatively, the rigid elements 21 are provided from rigid cellular foam.

Further, in a step S2 a plurality of flexible elements 22 having the height H1 and the length L are provided.

In a step S3 each flexible element 22 is arranged between two rigid elements 21.

In a step S4 each flexible element 22 is connected to two rigid elements 21 such that the rigid elements 21 are flexibly connected to each other by means of the flexible elements 22. This connection step S4 can be done by means of gluing or hot plate welding. In particular, the steps S3 and S4 are executed as one step. At this stage the composite material 9 is created.

In a step S5 the composite material 9 can be cut such that a block 18 having the width W1 (see FIG. 6) is provided. Alternatively, steps S3, S4 are executed such that the block 18 having the width W1 is created immediately after the steps S3 and S4. In a step S6 the block 18 is cut into modules 16 having the height H. In a step S7 the module 16 is connected to the surface 17 of the blade shell 10 for producing the wind turbine blade 5.

Although the present invention has been disclosed in the form of preferred embodiments and variations thereon, it will be understood that numerous additional modifications and variations could be made thereto without departing from the scope of the invention For the sake of clarity, it is to be understood that the use of "a" or "an" throughout this application does not exclude a plurality, and "comprising" does not exclude other steps or elements.

The invention claimed is:

1. A wind turbine blade for a wind turbine comprising:
a module comprising a composite material, the composite material having a sequence of elements consisting of rigid elements and flexible elements alternating with respect to each other, wherein a first element of the sequence is one rigid element of the rigid elements and a last element of the sequence is another rigid element of the rigid elements, wherein all rigid and flexible elements are in the sequence of elements within the composite material of the module,
wherein each flexible element is arranged between two of the plurality of rigid elements and is connected thereto such that the rigid elements are flexibly connected to each other by the flexible elements,
wherein each respective flexible element is connected to the respective two of the plurality of rigid elements by an adhesive placed between the respective flexible element and the respective two of the plurality of rigid elements or by hot plate welding,
wherein the rigid elements and the flexible elements are bar-shaped with a length at least several times greater than a height and width,
wherein the flexible elements are plastically or elastically deformable, and
wherein the composite material is flexible in a bending direction around a longitudinal axis of the rigid element and is configured for reinforcing a blade shell of the wind turbine blade.

2. The wind turbine blade according to claim 1, wherein the module is connected to a curved surface of a blade shell of the wind turbine blade by being adapted to the curved surface such that the flexible elements are deformed and the rigid elements are not deformed by the connection of module to the curved surface.

3. The wind turbine blade according to claim 1, wherein a length of the rigid elements is at least 10 times larger than both a height of the rigid elements and a width of the rigid elements.

4. The wind turbine blade according to claim 1, wherein the rigid elements are made of balsa wood or rigid cellular foam.

5. The wind turbine blade according to claim 1, wherein the flexible elements comprise a flexible material that is more rigid than blade resin.

6. The wind turbine blade according to claim 1, the flexible elements comprise plastic material, wherein the plastic material is one of a thermoplastic material, elastomeric material and thermosetting material.

7. The wind turbine blade according to claim 1, wherein the flexible elements have a ductility greater than a ductility of the rigid elements, and wherein the ductility of the flexible elements is of a magnitude that enables contourability to be induced to the composite material by gravity.

8. The wind turbine blade according to claim 1, wherein the flexible elements comprise an aluminum foam.

9. A wind turbine comprising:
a wind turbine blade that includes a module comprising a composite material, the composite material having a sequence of elements consisting of rigid elements and flexible elements alternating with respect to each other, wherein a first element of the sequence is one rigid element of the rigid elements and a last element of the sequence is another rigid element of the rigid elements, wherein all rigid and flexible elements are in the sequence of elements within the composite material of the module,
wherein each flexible element is arranged between two of the plurality of rigid elements and is connected thereto such that the rigid elements are flexibly connected to each other by the flexible elements,
wherein each respective flexible element is connected to respective rigid elements by an adhesive placed between the respective flexible element and the respective flexible rigid elements or by hot plate welding,
wherein the rigid elements and the flexible elements are bar-shaped with a length at least several times greater than a height and width,
wherein the flexible elements are plastically or elastically deformable, and
wherein the composite material is flexible in a bending direction around a longitudinal axis of the rigid elements and is configured for reinforcing a blade shell of the wind turbine blade.

10. The wind turbine according to claim 9, wherein the module is connected to a curved surface of a blade shell of the wind turbine blade by being adapted to the curved surface such that the flexible elements are deformed and the rigid elements are not deformed by the connection of module to the curved surface.

11. A method for producing a wind turbine blade, the method comprising the steps of:
a) providing a plurality of rigid elements, each rigid element having a height H1;
b) providing a plurality of flexible elements, each flexible element having a height H1;
c) arranging each flexible element between two rigid elements;
d) connecting each flexible element to two rigid elements by an adhesive placed between each flexible element and the two respective rigid elements or by hot plate welding such that the two respective rigid elements are flexibly connected to each other by the flexible elements to form a composite material;
(e) cutting the composite material to form a block having a specified width W1;
(f) cutting the block into multiple modules, each module having a height H, wherein H1/H is at least 3; and
(g) connecting one module of the multiple modules to a curve surface of a blade shell of the wind turbine blade, wherein the rigid elements and the flexible elements are bar-shaped with a length at least several times greater than a height and width, wherein the flexible elements are plastically deformable, and wherein the composite material is flexible in a bending direction around a longitudinal axis of the rigid elements and is configured for reinforcing the blade shell of the wind turbine blade.

12. The method according to claim 11, wherein the one module comprises the composite material, the composite material having a sequence of elements consisting of the rigid elements and the flexible elements alternating with respect to each other, wherein a first element of the sequence is one rigid element of the rigid elements and a last element of the sequence is another rigid element of the rigid elements, wherein all rigid and flexible elements are in the sequence of elements within the composite material of the one module.

13. The method according to claim 11, wherein the module is connected to a curved surface of a blade shell of the wind turbine blade by being adapted to the curved surface such that the flexible elements are deformed and the rigid elements are not deformed by the connection of module to the curved surface.

* * * * *